(12) United States Patent
Morris et al.

(10) Patent No.: US 12,244,127 B2
(45) Date of Patent: Mar. 4, 2025

(54) CUTTING ARM FOR A CABLE PREPARATION MACHINE

(71) Applicant: TE Connectivity Services GmbH, Schaffhausen (CH)

(72) Inventors: Michael Morris, Middletown, PA (US); Thomas Emery Backenstoes, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 400 days.

(21) Appl. No.: 17/004,854

(22) Filed: Aug. 27, 2020

(65) Prior Publication Data

US 2022/0069552 A1 Mar. 3, 2022

(51) Int. Cl.
*H02G 1/00* (2006.01)
*B23D 17/00* (2006.01)
*H02G 1/12* (2006.01)

(52) U.S. Cl.
CPC ............. *H02G 1/005* (2013.01); *B23D 17/00* (2013.01); *H02G 1/1253* (2013.01)

(58) Field of Classification Search
CPC .. H02G 1/1224; H02G 1/1212; H02G 1/1265; H02G 1/005; H02G 1/1253; B26D 21/00; B26D 7/2642; B26D 3/16; B26D 3/14; B23D 25/04; B23D 29/002; B23D 29/023; B23D 35/001; B23D 35/002; B23D 35/005; B23D 45/126; B23D 47/00; B23D 1/04; B23D 21/08; B23D 4/126; B21D 37/06; B23B 31/107; B23B 31/1075; Y10T 403/60; Y10T 403/602; Y10T 403/604

USPC ........ 83/319, 694, 388; 30/90.1–91.2, 92–95
See application file for complete search history.

(56) References Cited

U.S. PATENT DOCUMENTS

| | | | | |
|---|---|---|---|---|
| 813,359 | A * | 2/1906 | Deforest | F16L 17/04 285/317 |
| 823,796 | A * | 6/1906 | Keyes | B23D 21/10 30/95 |
| 951,718 | A * | 3/1910 | Arnsdorff | B65H 75/40 242/407 |
| 1,279,022 | A * | 9/1918 | Scott | B23D 21/08 30/96 |
| 1,541,435 | A * | 6/1925 | Reller | F04C 15/0076 418/130 |
| 1,687,590 | A * | 10/1928 | Randol | B60W 10/10 74/334 |

(Continued)

FOREIGN PATENT DOCUMENTS

| | | |
|---|---|---|
| CN | 108110685 A | 6/2018 |
| JP | S57170621 U | 10/1982 |
| KR | 20090012235 U | 12/2009 |

OTHER PUBLICATIONS

PCT International Search Report, Intl App No. PCT/IB2021/057838, dated Oct. 29, 2021, 4 pages.

*Primary Examiner* — Evan H MacFarlane
*Assistant Examiner* — Fernando A Ayala

(57) ABSTRACT

A cutting arm includes a base having a post receiving passageway extending through the base, a cutting assembly attached to the base, and a sliding plate attached to the base and movable with respect to the base between an engaging position and a releasing position. The sliding plate engages a post disposed in the post receiving passageway in the engaging position and releasably secures the cutting arm to the post.

16 Claims, 6 Drawing Sheets

(56) References Cited

U.S. PATENT DOCUMENTS

| | | | | |
|---|---|---|---|---|
| 2,395,534 | A * | 2/1946 | Cook | B23B 31/10741 279/82 |
| 2,401,149 | A * | 5/1946 | Gordon | H02G 1/1265 81/9.51 |
| 2,903,064 | A * | 9/1959 | Blonder | H02G 1/1229 30/233 |
| 3,226,999 | A * | 1/1966 | Allison | H01H 19/11 74/10.41 |
| 3,254,407 | A * | 6/1966 | Armand | H02G 1/1224 30/91.2 |
| 3,604,735 | A * | 9/1971 | Hoffmeister | A61C 1/18 403/375 |
| 3,714,712 | A * | 2/1973 | Hoffman | B23D 21/08 30/95 |
| 3,836,464 | A * | 9/1974 | Miller et al. | B01D 29/58 210/489 |
| 3,863,464 | A * | 2/1975 | Taggart | F16D 3/00 464/903 |
| 4,146,959 | A * | 4/1979 | Hopper | B26D 3/169 30/95 |
| 4,449,298 | A * | 5/1984 | Putz | H02G 1/1226 30/90.1 |
| 4,572,047 | A * | 2/1986 | Punater | B23D 35/008 279/2.03 |
| 4,586,836 | A * | 5/1986 | Moulin | B41J 1/243 400/175 |
| 4,930,932 | A * | 6/1990 | LeVahn | A61B 17/02 403/324 |
| 4,951,538 | A * | 8/1990 | Borzym | B23D 21/00 83/555 |
| 5,203,083 | A * | 4/1993 | Domonoske | B23D 21/10 30/162 |
| 5,235,748 | A * | 8/1993 | Jahn | B26D 3/169 7/164 |
| 5,315,759 | A * | 5/1994 | Mashata | B23D 21/00 30/97 |
| 6,009,735 | A * | 1/2000 | Knotek | B23B 5/167 72/70 |
| 6,390,943 | B1 * | 5/2002 | Dreger | F16G 15/00 474/223 |
| 8,490,261 | B2 * | 7/2013 | Frenken | F16L 13/141 72/409.01 |
| 9,812,101 | B1 * | 11/2017 | Miyajima | F16M 11/16 |
| 9,895,796 | B2 * | 2/2018 | Nino | B25G 3/26 |
| 10,574,040 | B2 * | 2/2020 | Troy | H01R 43/05 |
| 11,090,785 | B2 * | 8/2021 | Singh | B23B 31/1072 |
| 11,381,061 | B2 * | 7/2022 | Symington | H02G 1/005 |
| 2005/0125978 | A1 * | 6/2005 | Frenken | B25B 27/10 29/237 |
| 2005/0135890 | A1 * | 6/2005 | Bauman | B23B 51/12 408/239 R |
| 2006/0181141 | A1 * | 8/2006 | Morris | B65F 1/1473 301/111.01 |
| 2007/0176036 | A1 * | 8/2007 | Venes | A01K 89/01931 242/322 |
| 2010/0098484 | A1 * | 4/2010 | Chen | B62M 3/08 403/380 |
| 2010/0186564 | A1 * | 7/2010 | Pierce | B23D 59/001 83/72 |
| 2013/0152401 | A1 * | 6/2013 | Lee | B26D 3/169 30/99 |
| 2015/0128428 | A1 * | 5/2015 | Behringer | B23D 59/00 30/286 |
| 2018/0090918 | A1 * | 3/2018 | Houser | H02G 1/127 |
| 2018/0166867 | A1 * | 6/2018 | Troy | B26D 7/26 |
| 2018/0264671 | A1 * | 9/2018 | Bagley | B26D 3/283 |
| 2019/0123527 | A1 * | 4/2019 | Wagner | H02G 1/1256 |
| 2020/0067289 | A1 * | 2/2020 | Houser | H02G 1/1265 |
| 2020/0076148 | A1 | 3/2020 | Houser et al. | |
| 2020/0412114 | A1 * | 12/2020 | Sugawara | H02G 1/1268 |
| 2021/0119426 | A1 * | 4/2021 | Backenstoes | H02G 1/1258 |
| 2021/0154868 | A1 * | 5/2021 | Lau | B26B 1/048 |
| 2021/0273426 | A1 * | 9/2021 | Khu | H02G 1/1265 |
| 2021/0376581 | A1 * | 12/2021 | Wang | H02G 1/1265 |

* cited by examiner

CUTTING ARM FOR A CABLE PREPARATION MACHINE

FIELD OF THE INVENTION

The present invention relates to a cable preparation machine and, more particularly, to a cutting arm for a cable preparation machine.

BACKGROUND

A cable preparation machine is used to remove insulating and/or other layers of a cable to expose a conductor of the cable for further processing. The cable preparation machine includes a cutting arm that is pivotably mounted on a post and controlled to pivot about the post in order to cut the cable with different cutting elements of the cutting arm.

The cutting arm is positioned on the post and a retaining ring is pushed onto and engaged with the post in order to retain the cutting arm on the post. The positioning and engagement of the retaining ring on the post is time consuming and requires the use of particular manual tools. Likewise, the disengagement of the retaining ring from the post, such as to replace a worn cutting arm or exchange a cutting arm for a different size, suffers from similar inefficiencies.

SUMMARY

A cutting arm includes a base having a post receiving passageway extending through the base, a cutting assembly attached to the base, and a sliding plate attached to the base and movable with respect to the base between an engaging position and a releasing position. The sliding plate engages a post disposed in the post receiving passageway in the engaging position and releasably secures the cutting arm to the post.

BRIEF DESCRIPTION OF THE DRAWINGS

The invention will now be described by way of example with reference to the accompanying Figures, of which.

DETAILED DESCRIPTION OF THE EMBODIMENTS

Figure 1:
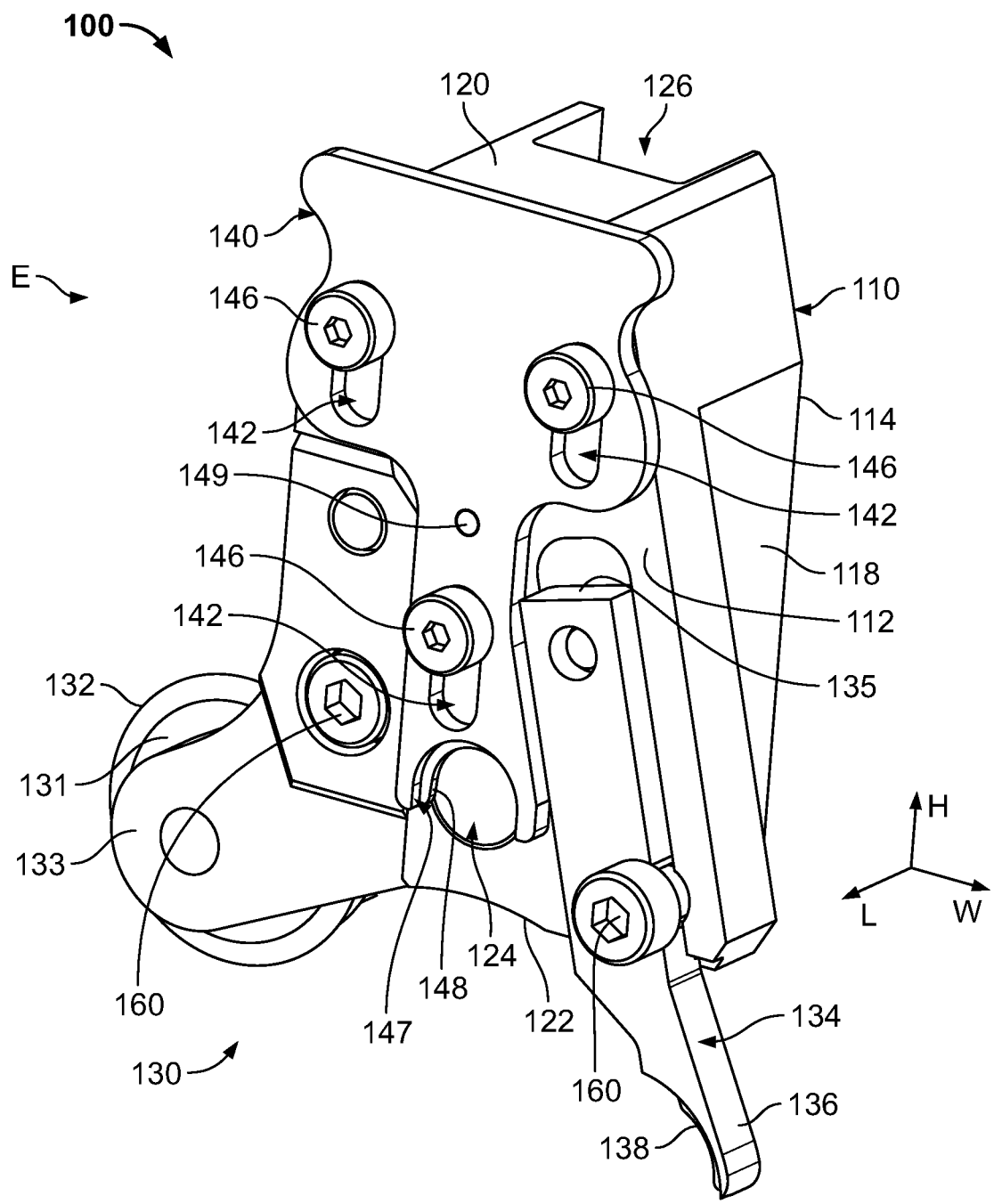
FIG. 1 is a perspective view of a cutting arm according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 2:
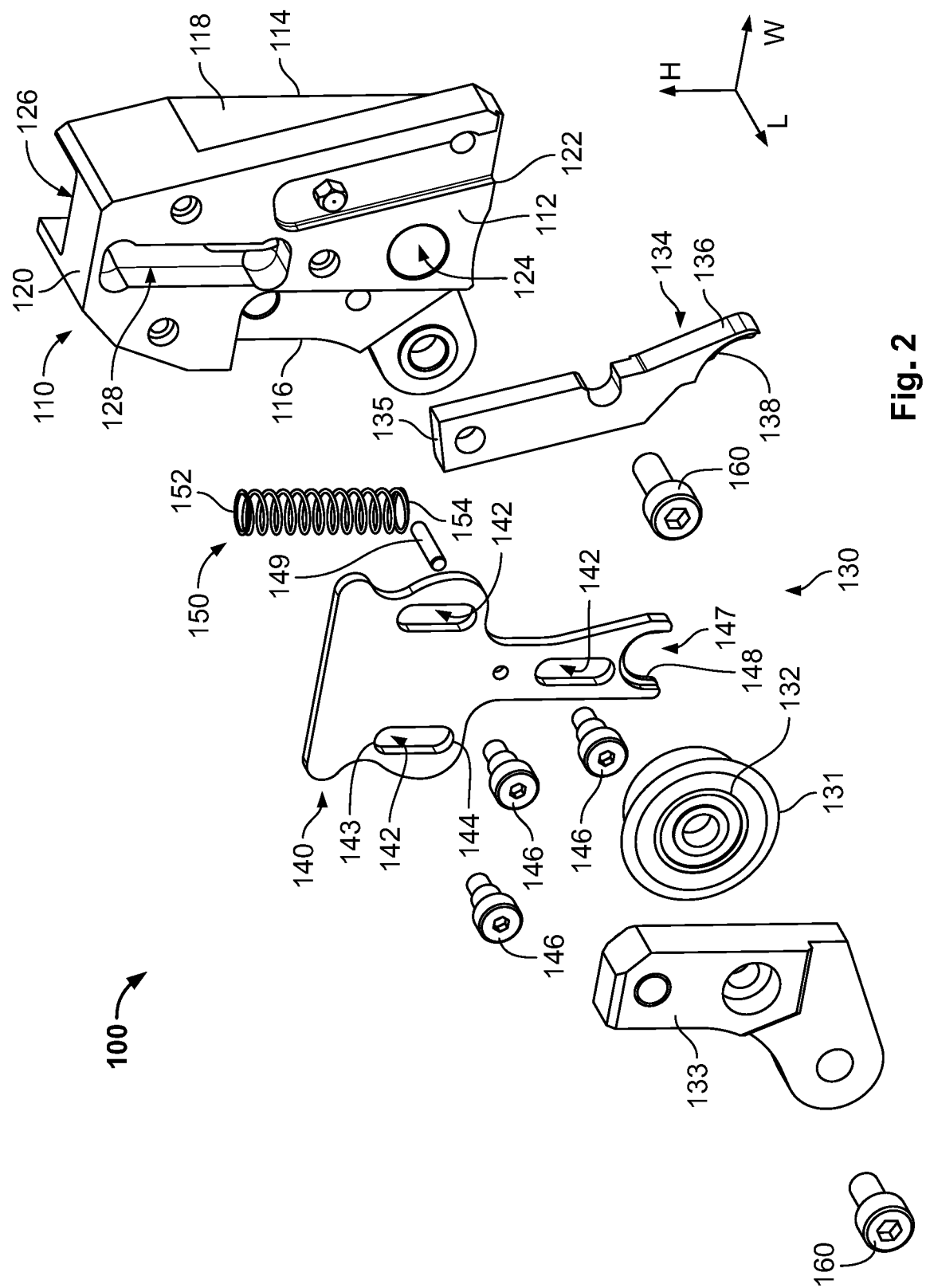
FIG. 2 is an exploded perspective view of the cutting arm.
Figure 3:
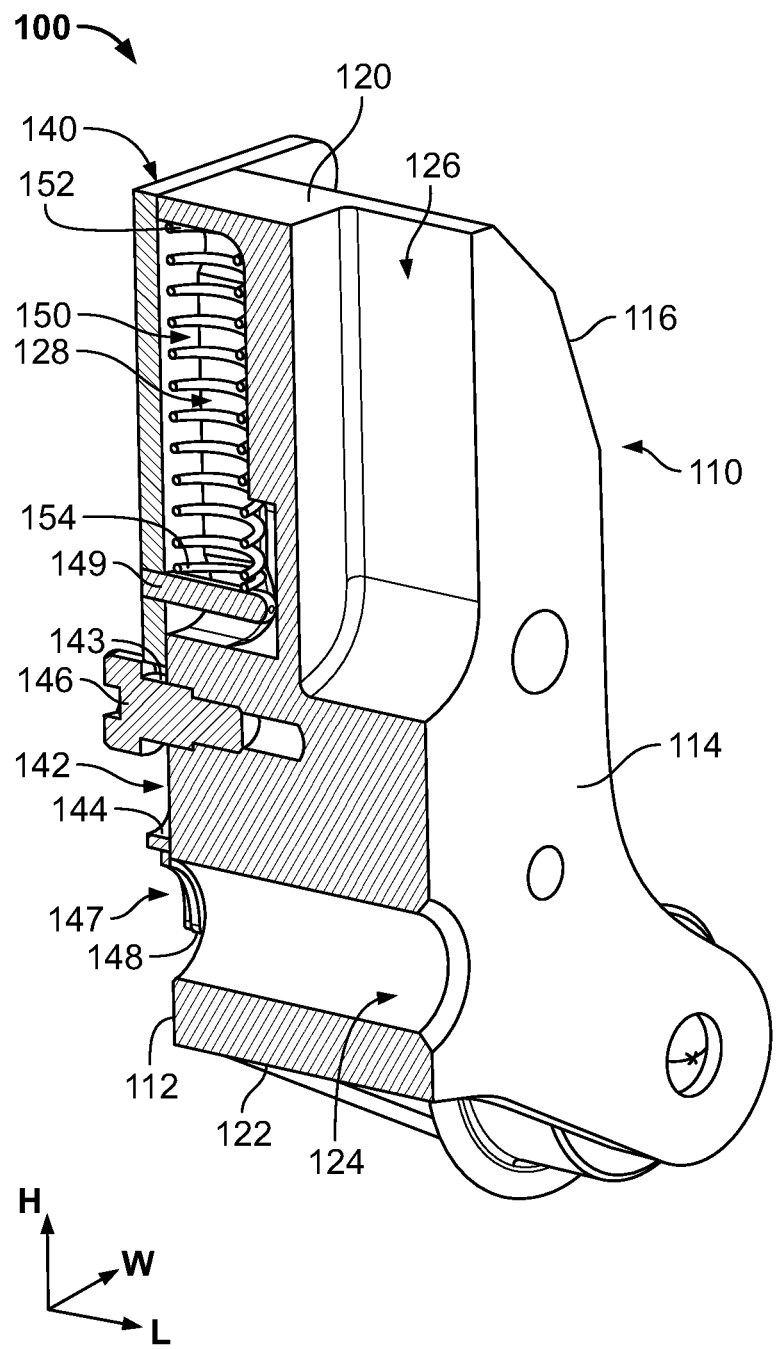
FIG. 3 is a sectional perspective view of the cutting arm.

A cutting arm 100 according to an embodiment is shown in FIGS. 1-3. The cutting arm 100 includes a base 110, a cutting assembly 130 attached to the base 110, a sliding plate 140 attached to and movable with respect to the base 110, and a biasing member 150 disposed within the base 110.

The base 110, as shown in FIGS. 1-3, has an approximately rectangular parallelepiped shape in the shown embodiment with a front side 112 and a rear side 114 opposite to the front side 112 in a longitudinal direction L. The base 110 has a first lateral side 116 and a second lateral side 118 opposite to the first lateral side 116 in a width direction W perpendicular to the longitudinal direction L, and a top end 120 and a bottom end 122 opposite to the top end 120 in a height direction H perpendicular to the longitudinal direction L and the width direction W.

Figure 4:
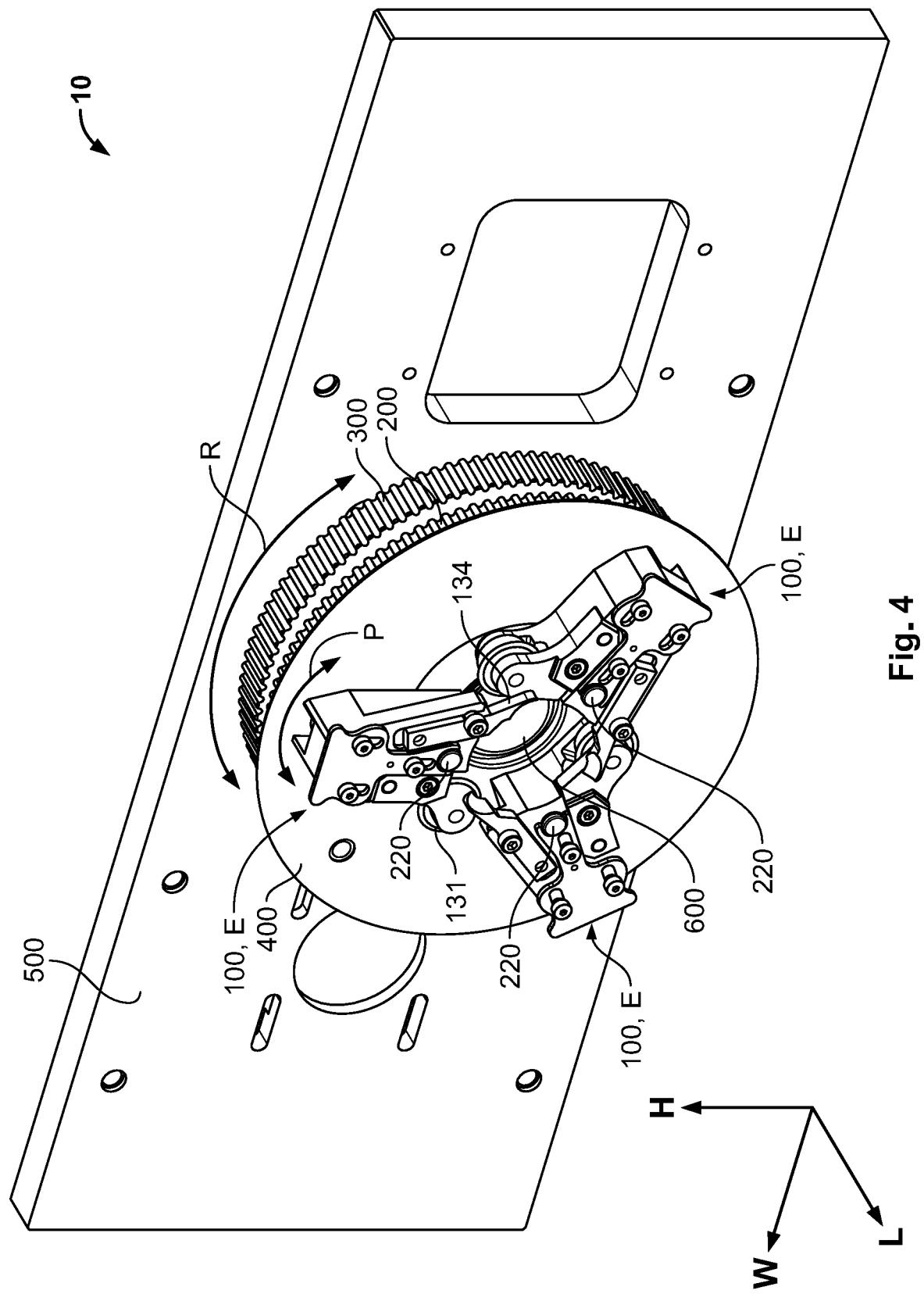
FIG. 4 is a perspective view of a cable preparation machine according to an embodiment.
Figure 5:
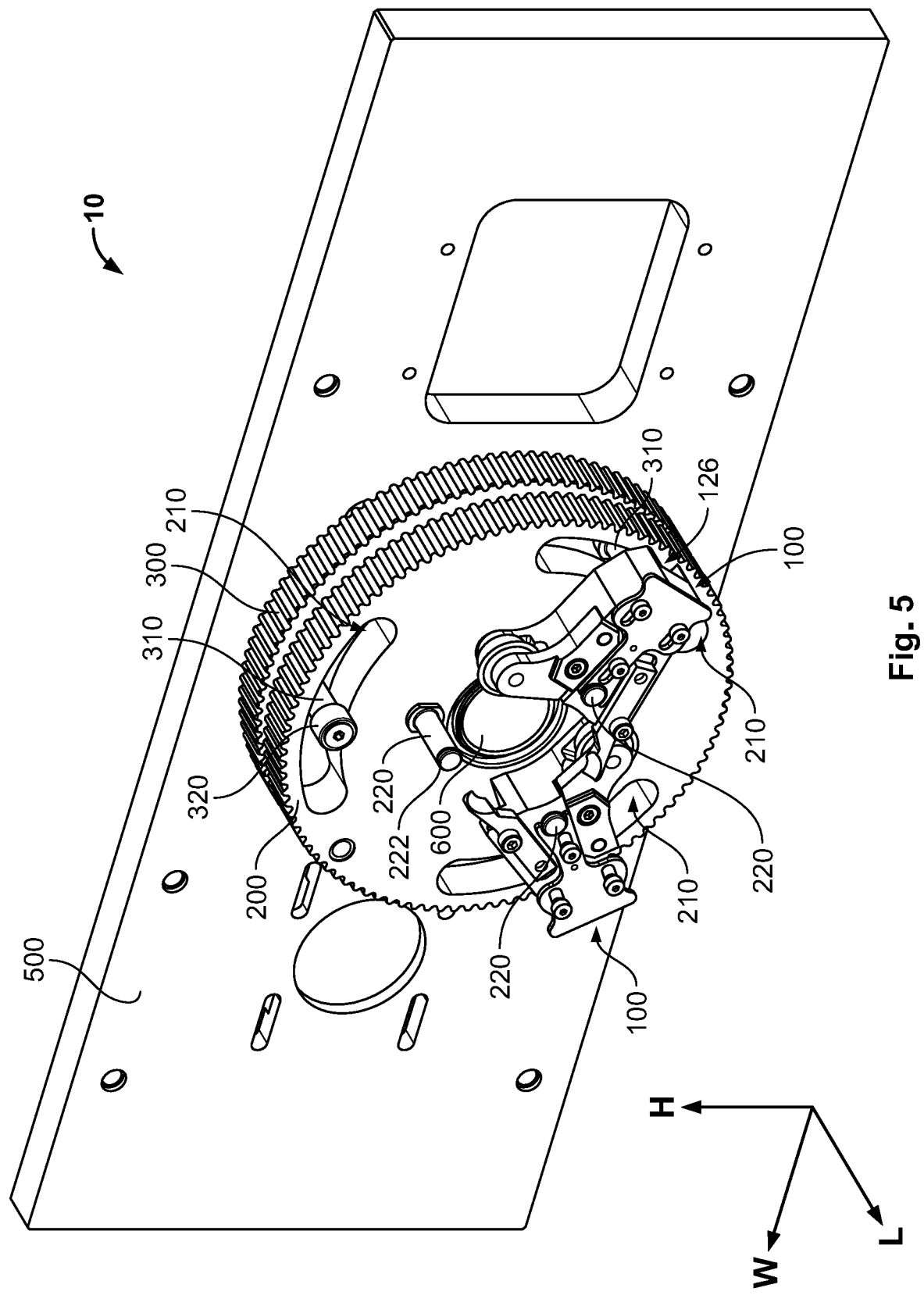
FIG. 5 is a perspective view of the cable preparation machine with a cutting arm and a separation plate removed.

The longitudinal direction L, the width direction W, and the height direction H referenced throughout the specification and the drawings are only an exemplary orientation of the cutting arm 100 used for explanation of the elements of the cutting arm 100 and are not intended to limit the orientation of the cutting arm 100 to that shown in FIG. 1. The cutting arm 100 may be rotated into other orientations in the L, W, H coordinate system, for example, as shown in FIGS. 4 and 5.

As shown in FIGS. 1-3, the base 110 has a post receiving passageway 124 extending through the base 110 from the front side 112 to the rear side 114 in the longitudinal direction L. The post receiving passageway 124 is positioned proximal to the bottom end 122 and distal from the top end 120 in the shown embodiment.

The base 110, as shown in FIGS. 1-3, has a follower slot 126 extending into the rear side 114 in the longitudinal direction L. The follower slot 126 extends partially into the base 110 from the rear side 114 and does not extend through to the front side 112. In the shown embodiment, the follower slot 126 extends approximately halfway into a thickness of the base 110 from the rear side 114 in the longitudinal direction L. In the height direction H, the follower slot 126 extends into the top end 120 and partially into the base 110, and does not extend through to the bottom end 122. In the shown embodiment, the follower slot 126 extends approximately halfway into a height of the base 110 from the top end 120 in the height direction H. In the shown embodiment, the follower slot 126 is U-shaped, with a curved end opposite the top end 120.

As shown in FIGS. 1-3, the base 110 has a biasing member recess 128 extending into the front side 112 in the longitudinal direction L. The biasing member recess 128 extends partially into the base 110 from the front side 112 and does not extend through to the rear side 114 in the longitudinal direction L. In the height direction H, the biasing member recess 128 is positioned proximal to the top end 120, but is closed to the top end 120, and is distal from the bottom end 122.

In the shown embodiment, the base 110 is monolithically formed in a single piece. In other embodiments, the base 110 can be formed from separate elements and assembled together to form the arrangement of the base 110 shown in FIGS. 1-3.

The cutting assembly 130, as shown in FIGS. 1 and 2, includes a cutting wheel 131, a wheel retaining portion 133 attached to the cutting wheel 131, and a cutting blade 134. The cutting wheel 131 has an outer edge 132 extending circumferentially around the cutting wheel 131. The outer edge 132 is formed as a sharp point. The wheel retaining portion 133 in the shown embodiment is approximately J-shaped. The cutting blade 134 extends from a first end 135 to a second end 136 opposite the first end 135. The second end 136 has a contour edge 138 on one side of the cutting blade 134. The contour edge 138 is formed as a sharp point.

The sliding plate 140, as shown in FIGS. 1-3, has a plurality of sliding slots 142, a plurality of plate retainers 146 extending into the sliding slots 142, an engaging end 147, and a bearing member 149.

The sliding slots 142, as shown in FIGS. 1-3, extend through the sliding plate 140 in the longitudinal direction L and extend from an upper end 143 to a lower end 144 in the height direction H. The upper end 143 and lower end 144 are only labeled for one of the sliding slots 142 in FIGS. 3 and 4 for clarity of the drawings but apply equally to each of the shown sliding slots 142. In the shown embodiment, the sliding plate 140 has three sliding slots 142. In other embodiments, the sliding plate 140 may have two sliding slots 142 or more than three sliding slots 142.

Each of the plate retainers 146 is a fastener, such as a screw, a bolt, or any other type of fastener, and extends into one of the sliding slots 142. In the shown embodiment, the sliding plate 140 has three plate retainers 146. In other embodiments, the sliding plate 140 may have any other number of plate retainers 146, provided at least one plate retainer 146 is positioned in each of the sliding slots 142.

The engaging end 147, as shown in FIGS. 1-3, is disposed at an end of the sliding plate 140 in the height direction H. The engaging end 147 has a protrusion 148 extending from the engaging end 147 in the height direction H. In the shown embodiment, the engaging end 147 has a semicircular shape, such a half circle, and the protrusion 148 has a contoured shape that follows a shape of the inner surface of the engaging end 147. A thickness of the protrusion 148 in the longitudinal direction L is less than a thickness of the engaging end 147 in the longitudinal direction L.

The bearing member 149, as shown in FIGS. 1-3, extends from the sliding plate 140 in the longitudinal direction L. The bearing member 149 is a pin in the shown embodiment that is attachable to the sliding plate 140. In other embodiments, the bearing member 149 may be a flat plate that is attachable to the sliding plate 140, or may be any other shape that extends from the sliding plate 140 and provides a bearing surface facing in the height direction H. In other embodiments, the bearing member 149 of any shape may be monolithically formed with the sliding plate 140 in a single piece. In the shown embodiment, the bearing member 149 extends from the sliding plate 140 from a position approximately central on the sliding plate 140 in the height direction H. In other embodiments, the bearing member 149 could be positioned anywhere else along the height direction H along the sliding plate 140.

The biasing member 150, as shown in FIGS. 2 and 3, is a spring that extends from a first end 152 to a second end 154 along the height direction H. The spring is a coil spring in the shown embodiment but, in other embodiments, could be any other type of elastic member that provides a biasing force when compressed between the ends 152, 154.

The assembly of the cutting arm 100 will now be described in greater detail with reference to FIGS. 1-3. A plurality of the fasteners 160 of the cutting arm 100 are shown in FIGS. 1-3 and used to assemble the cutting arm 100. The fasteners 160 may each be a screw, a bolt, or any other type of fastener.

The cutting assembly 130 is attached to the front side 112 of the base 110. As shown in FIGS. 1 and 2, the wheel retaining portion 133 is attached to the front side 112 of the base 110 adjacent to the first lateral side 116 by one of the fasteners 160. The cutting wheel 131 is attached to the base 110 by the wheel retaining portion 133 and is held between the wheel retaining portion 133 and the base 110. The cutting wheel 131 is rotatable with respect to the wheel retaining portion 133 and the base 110. The cutting wheel 131, in the fully assembled state of the cutting arm 100 shown in FIG. 1, extends beyond the bottom end 122 of the base 110 in the height direction H and extends beyond the first lateral side 116 of the base 110 in the width direction W.

The cutting blade 134, as shown in FIGS. 1 and 2, is attached to the front side 112 of the base 110 adjacent to the second lateral side 118 by one of the fasteners 160. The first end 135 of the cutting blade 134 is attached to the base 110 and the second end 136 extends from the base 110. The second end 135 of the cutting blade 134 extends beyond the bottom end 122 of the base 110 in the height direction H and extends beyond the second lateral side 118 of the base 110 in the width direction W.

The sliding plate 140, as shown in FIGS. 1-3, is attached to the front side 112 of the base 110. Each of the plate retainers 146 positioned in one of the sliding slots 142 engages the base 110 to secure the sliding plate 140 to the front side 112. The engaging end 147 is positioned in alignment with the post receiving passageway 124 along the height direction H. The bearing member 149 extends into the biasing member recess 128, as shown in FIG. 3.

The biasing member 150, as shown in FIGS. 2 and 3, is disposed in the biasing member recess 128 of the base 110. The first end 152 of the biasing member 150 abuts the base 110 at an inner side of the top end 120 and the second end 154 of the biasing member 150 abuts the bearing member 149.

The fully assembled state of the cutting arm 100 is shown in FIG. 1. In the fully assembled state, the sliding plate 140 is movable with respect to the base 110 between an engaging position E, shown in FIGS. 1 and 6B, and a releasing position R, shown in FIG. 6A. In the engaging position E, the plate retainers 146 each abut against the upper end 143 of the sliding slot 142 in which they disposed and the protrusion 148 overlaps an end of the post receiving passageway 124. In the releasing position R, the sliding plate 140 is moved in the height direction H and the plate retainers 146 are positioned closer to or in abutment with the lower end 144 of the sliding slot 142. The protrusion 148 no longer overlaps the end of the post receiving passageway 124 in the releasing position R.

Figure 6A:
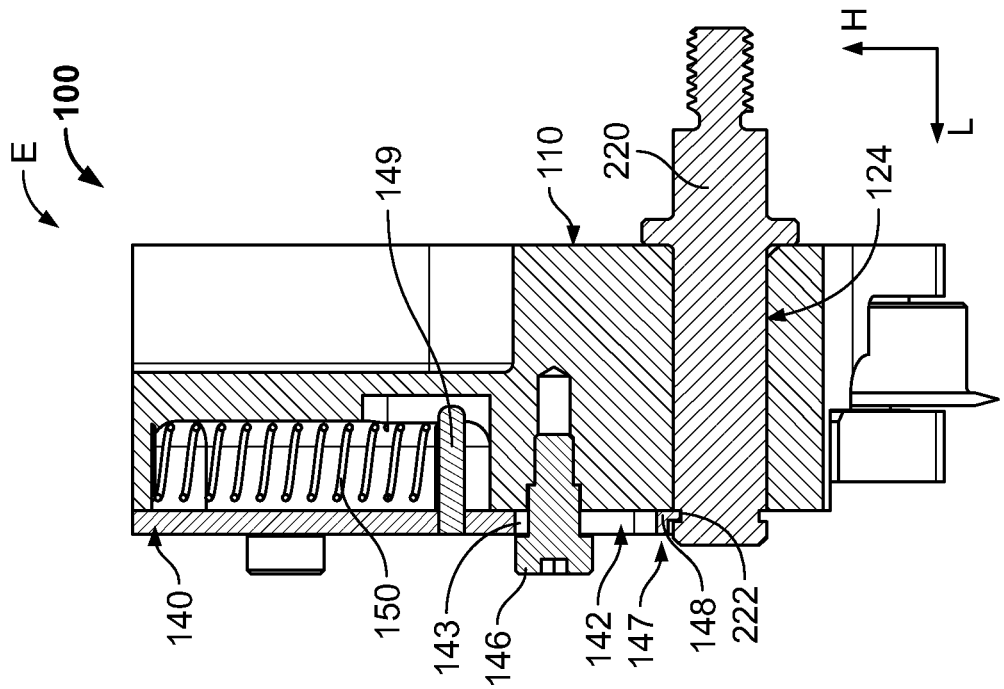
FIG. 6A is a sectional side view of the cutting arm in a releasing position on a post of the cable preparation machine.
Figure 6B:
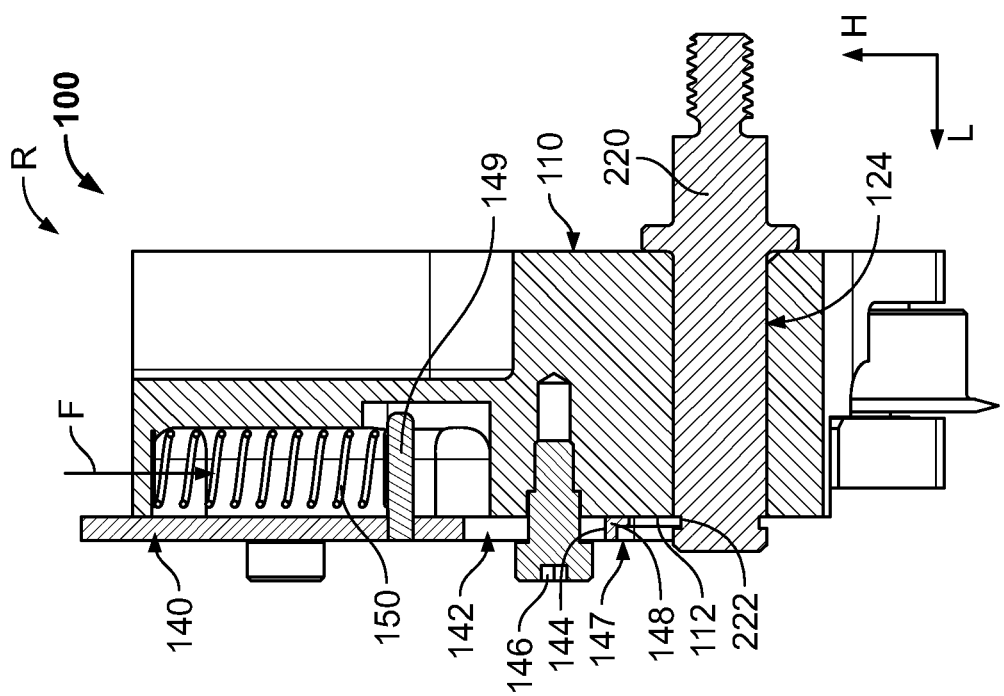
FIG. 6B is a sectional side view of the cutting arm in an engaging position on the post of the cable preparation machine.

As shown in FIGS. 6A and 6B, the biasing member 150 is compressed between the base 110 and the bearing member 149 in the releasing position R and provides a biasing force F in the height direction H biasing the sliding plate 140 toward the engaging position E. In an embodiment, the biasing member 150 is designed to also provide a force in the height direction H in the engaging position E that is less than the biasing force F to secure the sliding plate 140 in the engaging position E.

The cutting arm 100, as shown in FIGS. 4, 5, 6A, and 6B, in an embodiment is part of a cable preparation machine 10. The cable preparation machine 10 includes a plurality of cutting arms 100 as described in detail above, a first wheel 200, a second wheel 300 rotatable with respect to the first wheel 200, a separation plate 400 disposed between the first wheel 200 and the plurality of cutting arms 100, a support 500 to which the wheels 200, 300 are attached, and a cable bore 600 extending through the wheels 200, 300 and the support 500. In the shown embodiment, the cable preparation machine 10 includes three cutting arms 100. In other embodiments, the cable preparation machine 10 could include one cutting arm 100, two cutting arms 100, or more than three cutting arms 100.

The first wheel 200, as shown in FIGS. 4 and 5, has a plurality of cam slots 210 extending through the first wheel 200 and a plurality of posts 220 extending from the first wheel 200. The cam slots 210 each extend through the first wheel 200 along the longitudinal direction L and extend circumferentially along a portion of the first wheel 200 in a plane defined by the height direction H and the width direction W. The posts 220 are fixed to and extend from the first wheel 200 along the longitudinal direction L, and have a groove 222 extending into the post 220 and around the post 220 at an end opposite the first wheel 200. The posts 220 are positioned closer to a center of the first wheel 200 than the cutting arms 100.

In the embodiment shown in FIGS. 4 and 5, the first wheel 200 has three cam slots 210 and three posts 220, with each set of elements spaced equally from each other in a circumferential direction of the first wheel 200. Each of the cam slots 210 and each of the posts 220 corresponds to one of the cutting arms 100. In other embodiments, the number of cam slots 210 and the number of posts 220 could be different provided that they each correspond to the number of cutting arms 100 in the cable preparation machine 10.

The second wheel 300, as shown in FIGS. 4 and 5, has a plurality of cams 310 fixed to and extending from the second wheel 300 along the longitudinal direction L and a roller 320 disposed on an end of each of the cams 310. The roller 320 is rotatable with respect to the cam 310. Only one of the cams 310 with a roller 320 is shown in FIG. 5 for clarity of the drawings, however, the second wheel 300 has one cam 310 with one roller 320 corresponding to each of the cutting arms 100 shown in FIGS. 4 and 5.

In the shown embodiment, the second wheel 300 has three cams 310 with three rollers 320 spaced equally from each other in a circumferential direction of the second wheel 300. In other embodiments, the number of cams 310 each having a roller 320 could be different provided they correspond to the number of cutting arms 100 in the cable preparation machine 10.

As shown in FIGS. 4 and 5, the cable bore 600 extends through the support 500 along the longitudinal direction L. The first wheel 200 and the second wheel 300 are positioned around the cable bore 600. The second wheel 300 is adjacent to the support 500 and the first wheel 200 is adjacent to the second wheel 300; the second wheel 300 is positioned between the first wheel 200 and the support 500 along the longitudinal direction L. The second wheel 300 is positioned with each of the cams 310 extending through and positioned in one of the cam slots 210. The separation plate 400 is positioned between the first wheel 200 and the plurality of cutting arms 100 along the longitudinal direction L, exposing the plurality of posts 220.

The attachment of each of the cutting arms 100 to one of the posts 220 will now be described in greater detail with the post 220 exposed and the cam 310 extending through the cam slot 210 as shown in the top portion of FIG. 5. In FIGS. 6A and 6B, the wheels 200, 300, except for the posts 220, are omitted for clarity of the drawings but are positioned as shown in FIGS. 4 and 5.

With the cutting arm 100 off the post 220, the cutting arm 100 is moved to the releasing position R shown in FIG. 6A by sliding the sliding plate 140 until the plate retainers 146 are disposed near or in abutment with the lower ends 144 of the slots 142. The sliding plate 140 is held in the releasing position R against the biasing force F while the cutting arm 100 is moved toward the first wheel 200 to insert the post 220 into the post receiving passageway 124 along the longitudinal direction L, for example manually by a user or automatically by a machine.

The post 220 is inserted into the post receiving passageway 124 until the groove 222 is positioned outside of the post receiving passageway 124 and aligned with the front side 112, as shown in FIG. 6A. The sliding plate 140 is then released, and the biasing force F of the biasing member 150 moves the sliding plate 140 back to the engaging position E shown in FIG. 6B. In the engaging position E, as shown in FIGS. 1 and 6B, the sliding plate 140 engages the post 220 disposed in the post receiving passageway 124 to releasably secure the cutting arm 100 to the post 220. The protrusion 148 at the engaging end 147 is positioned in and engages the groove 222 of the post 220, securing against movement of the cutting arm 100 along the longitudinal direction L with respect to the post 220.

To remove the cutting arm 100 from the post 220, the sliding plate 140 is moved from the engaging position E in FIG. 6B back to the releasing position R in FIG. 6A. The protrusion 148 is disengaged from the groove 222 and spaced apart from the groove 222 in the height direction H in the releasing position R. The sliding plate 140 is held in the releasing position R against the biasing force F while the cutting arm 100 is moved off of the post 220 along the longitudinal direction L. The sliding plate 140 is in the releasing position R both when the post 220 is inserted into the post receiving passageway 124 to install the cutting arm 100 and when the post 220 is removed from the post receiving passageway 124 to remove the cutting arm 100.

During use of the cable preparation machine 10, the cutting arms 100 are each in the engaging position E on one of the posts 220, as shown in FIG. 4. The cutting arms 100 are each pivotable about the posts 220 in the engaging position E along a pivot direction P shown in FIG. 4. In the engaging position E of the cutting arm 100, the cam 310 extending through the cam slot 210 as shown in FIG. 5 extends into the follower slot 126 of the cutting arm 100.

With a cable disposed in the cable bore 600, the first wheel 200 and the second wheel 300 are rotatable with respect to each other about the cable bore 600 in a rotation direction R shown in FIG. 4 by, for example, a pulley or any other drive element. As the wheels 200, 300 rotate with respect to one another about the rotation direction R, the cam 310 moves along the cam slot 210, and the roller 320 on the end of the cam 310 rolls along the base 110 in the follower slot 126 shown in FIG. 5, pivoting the cutting arm 100 in the pivot direction P about the post 220.

Pivoting the cutting arm 100 one way in the pivot direction P moves the contour edge 138 of the cutting bade 134 into engagement with the cable, for example to remove an outer or an inner insulation layer of the cable. Pivoting the cutting arm 100 the opposite way in the pivot direction P moves the cutting wheel 131 into engagement with the cable, for example to flare and cut a braid of the cable. The wheels 200, 300 can be controlled to rotate with respect to each other and pivot the cutting arms 100 either way along the pivot direction P to prepare the cable as needed.

The cutting arm 100 according to the embodiments described herein is releasably securable to the post 220 by movement of the sliding plate 140 between the releasing position R and the engaging position E. No extra tools are required to move the cutting arm 100 between the releasing position R and the engaging position E, easing the difficulty and reducing the time necessary in exchanging the cutting arm 100 for wear or for use with cables of different size. The ease of moving the cutting arm 100 between the releasing position R and the engaging position E could also allow the cutting arm 100 to be manipulated by machines in automation of necessary changeover for wear or size.

What is claimed is:

1. A cutting arm, comprising:
   a base having a post receiving passageway extending through the base and a biasing member recess extending into a front side of the base;
   a cutting assembly attached to the base; and
   a sliding plate attached to the front side of the base and movable linearly along the front side with respect to the base between an engaging position and a releasing position, the sliding plate covers the biasing member recess, the sliding plate engages a post disposed in the post receiving passageway in the engaging position and releasably secures the cutting arm to the post, the cutting arm is pivotable about the post while the sliding plate engages the post in the engaging position, the sliding plate has an engaging end with a protrusion, and the protrusion engages a groove of the post when the sliding plate is in the engaging position.

2. The cutting arm of claim 1, further comprising a biasing member applying a biasing force biasing the sliding plate toward the engaging position.

3. The cutting arm of claim 2, wherein the biasing member is disposed in the biasing member recess of the base.

4. The cutting arm of claim 3, wherein the sliding plate has a bearing member extending into the biasing member recess.

5. The cutting arm of claim 4, wherein a first end of the biasing member abuts the base and a second end of the biasing member abuts the bearing member.

6. The cutting arm of claim 5, wherein the biasing member is compressed between the base and the bearing member in the releasing position.

7. The cutting arm of claim 1, wherein the protrusion is disengaged and spaced apart from the groove when the sliding plate is in the releasing position.

8. The cutting arm of claim 1, wherein the sliding plate has a plurality of sliding slots and a plurality of plate retainers attaching the sliding plate to the base, each of the plate retainers extends through one of the sliding slots.

9. The cutting arm of claim 8, wherein the plate retainers are disposed at an upper end of each of the sliding slots when the sliding plate is in the engaging position and the plate retainers are disposed at a lower end of each of the sliding slots when the sliding plate is in the releasing position.

10. The cutting arm of claim 1, wherein the cutting assembly includes a cutting wheel attached to the base by a wheel retaining portion, and the cutting wheel is rotatable with respect to the base and the wheel retaining portion.

11. The cutting arm of claim 10, wherein the cutting assembly includes a cutting blade having a first end attached to the base and a second end extending from the base, and the second end has a contour edge.

12. The cutting arm of claim 11, wherein the cutting wheel extends beyond a bottom end and a first lateral side of the base, and the cutting blade extends beyond the bottom end and a second lateral side of the base opposite the first lateral side.

13. The cutting arm of claim 1, wherein the base has a follower slot extending into a rear side of the base opposite the front side of the base, and the cutting assembly is attached to the front side.

14. A cable preparation machine, comprising:
   a first wheel having a post fixed to and extending from the first wheel;
   a cutting arm including a base having a post receiving passageway extending through the base and a biasing member recess extending into a front side of the base, a cutting assembly attached to the base, and a sliding plate attached to the front side of the base and movable along the front side with respect to the base between an engaging position and a releasing position, the sliding plate covers the biasing member recess, the post is disposed in the post receiving passageway and the sliding plate engages the post in the engaging position, releasably securing the cutting arm to the post; and
   a second wheel having a cam fixed to and extending from the second wheel, the cam extends through a cam slot in the first wheel and into a follower slot of the base, the cutting arm is pivotable about the post by movement of the first wheel with respect to the second wheel while the sliding plate engages the post in the engaging position.

15. The cable preparation machine of claim 14, wherein the post is inserted into the post receiving passageway and removed from the post receiving passageway with the sliding plate in the releasing position.

16. The cable preparation machine of claim 14, further comprising a cable bore, the first wheel and the second wheel are rotatable with respect to each other about the cable bore.

* * * * *